UNITED STATES PATENT OFFICE.

JOHN STAFFORD ELLITHORP, JR., OF PALATINE BRIDGE, NEW YORK.

PROCESS FOR PRODUCING JELLY.

1,199,457.    Specification of Letters Patent.    Patented Sept. 26, 1916.

No Drawing.    Application filed June 12, 1916. Serial No. 103,190.

*To all whom it may concern:*

Be it known that I, JOHN STAFFORD ELLITHORP, Jr., a citizen of the United States of America, and resident of Palatine Bridge, in the county of Montgomery, in the State of New York, have invented new and useful Improvements in Processes for Producing Jelly, of which the following is a full, clear, and exact description.

This invention relates to a process for producing fruit or vegetable jelly or gelatin by electrolysis in which a liquid solution or mixture of pectin, sugar and water in suitable proportions is subjected to the action of an electric current in such manner as to cause the deposition of the jelly upon and around one of the electrodes, in this instance the anode.

The main object is to manufacture such jellies more expeditiously and with greater economy than has heretofore been practised.

The invention, briefly stated, consists in subjecting any suitable quantity of fruit or vegetable juice preferably containing pectin to the action of an electric current through the medium of electrodes immersed in the solution.

In the laboratory experiments which I have conducted, I have prepared a mixture of concentrated fruit pectin, water and sugar in proportions of approximately one, three and four (1, 3 and 4), respectively, by weight, the mixture being then slightly warmed to expedite the solution. This solution was then placed in a U-tube containing two platinum electrodes which were then connected in an electric circuit carrying a current of approximately one hundred and ten (110) volts and suitable amperage with the result that in about an hour's time a solid jelly was deposited or collected around and upon the anode, and upon removal was found to be of true quality and good texture with a pleasing flavor corresponding to that of the original solution. It may be possible, however, to produce the same quality or texture of jelly by the same method but in a very much shorter time by the use of a current of increased amperage, and while my experiments were conducted with juices containing pectin, it may be possible to produce valuable jellies from other fruit and vegetable juices, and, therefore, the invention contemplates broadly the treatment of any vegetable or fruit juices or any solution containing the same by electrolysis, or by subjecting the same to the action of an electric current for the purpose of producing a jelly, but preferably by subjecting a mixture of fruit or vegetable juice containing pectin and sugar in suitable proportions to the action of an electric current of any suitable amperage.

What I claim is:

1. The process of producing jelly from fruit or vegetable juice containing pectin, consisting in subjecting the juice to the action of an electric current.

2. The process of producing jelly from a solution comprising sugar and fruit or vegetable juice containing pectin, consisting in subjecting the solution to the action of an electric current.

3. The herein described method of producing fruit jelly consisting in subjecting a mixture of fruit juice containing pectin and sugar in suitable proportions to the action of an electric current.

4. The process of producing jelly from juice consisting in subjecting the juice to the action of an electric current.

5. The process of producing jelly from juice consisting in confining the juice in a suitable receptacle and positioning the electrodes of a closed electric circuit in said juice.

6. The process of producing jelly from a solution of juice and sugar consisting in confining the solution in a suitable receptacle and positioning the electrodes of a closed electric circuit in said solution.

7. The process of producing jelly consisting in subjecting a solution of sugar, water and a juice containing pectin to the action of an electric current.

In witness whereof I have hereunto set my hand this 9th day of June, 1916.

JOHN STAFFORD ELLITHORP, JR.

Witnesses:
H. E. CHASE,
ALICE M. CANNON.